April 30, 1929. W. M. GAMBILL 1,711,019
ARTICULATOR
Filed Oct. 14, 1927   3 Sheets-Sheet 2
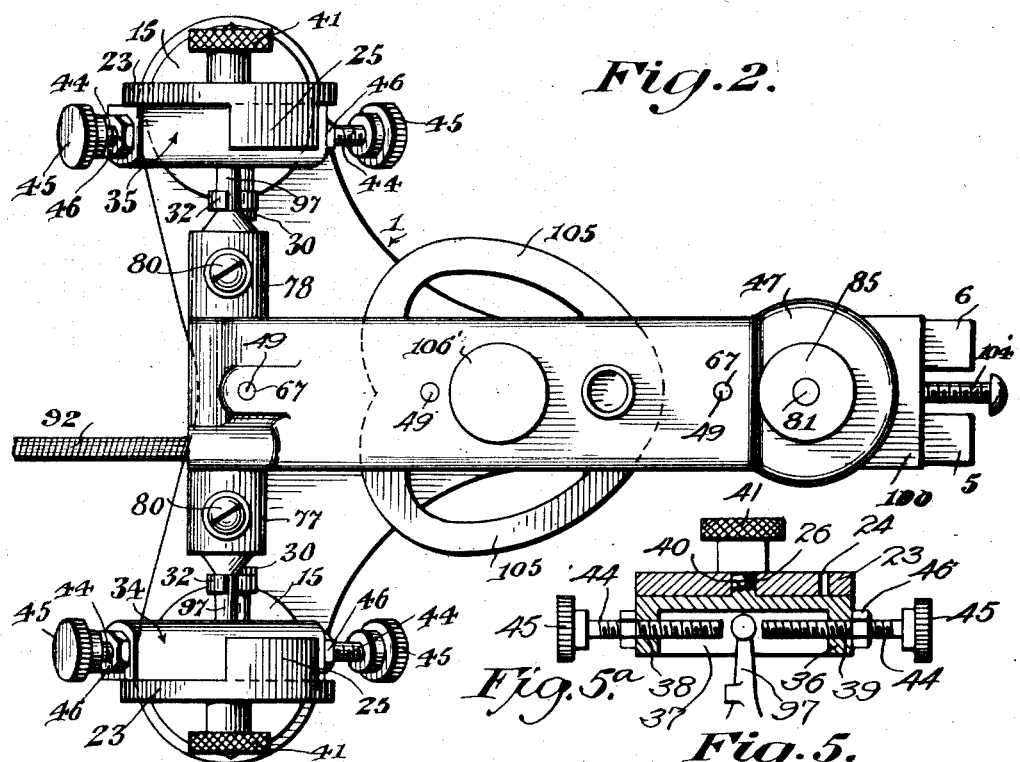
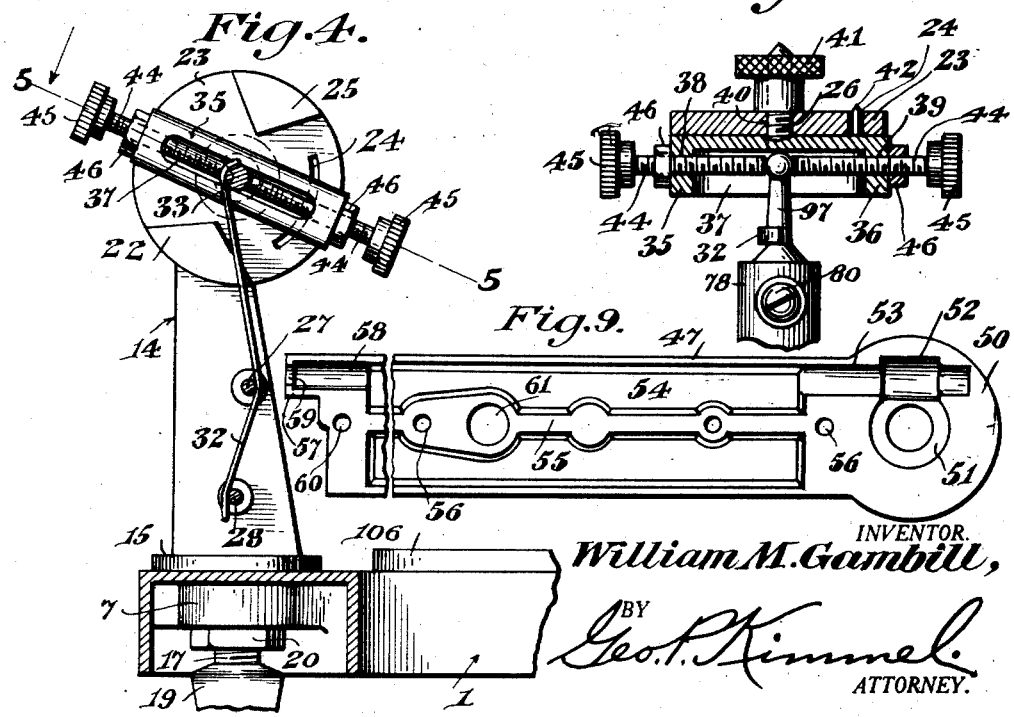
INVENTOR.
William M. Gambill,
BY
Geo. P. Kimmel
ATTORNEY.

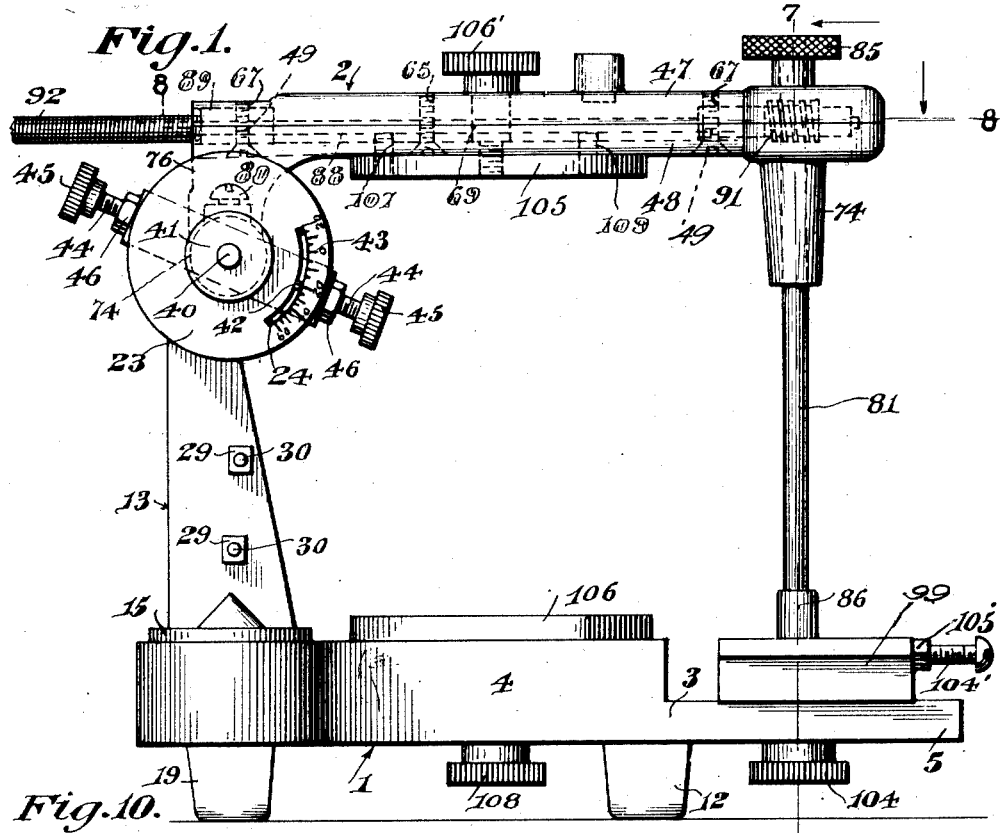
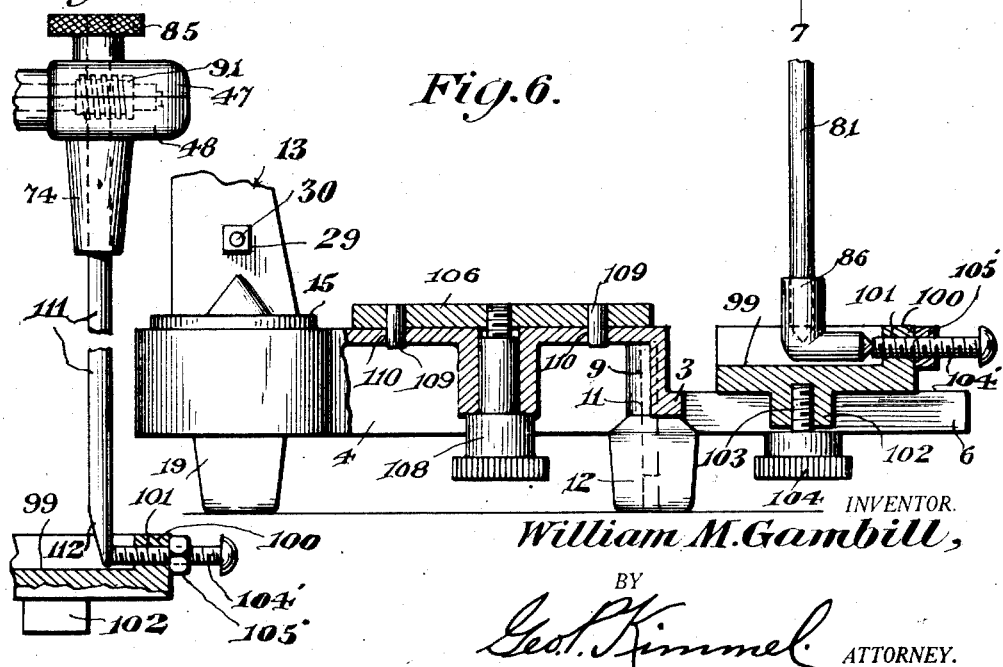

April 30, 1929.  W. M. GAMBILL  1,711,019
ARTICULATOR
Filed Oct. 14, 1927  3 Sheets-Sheet 3
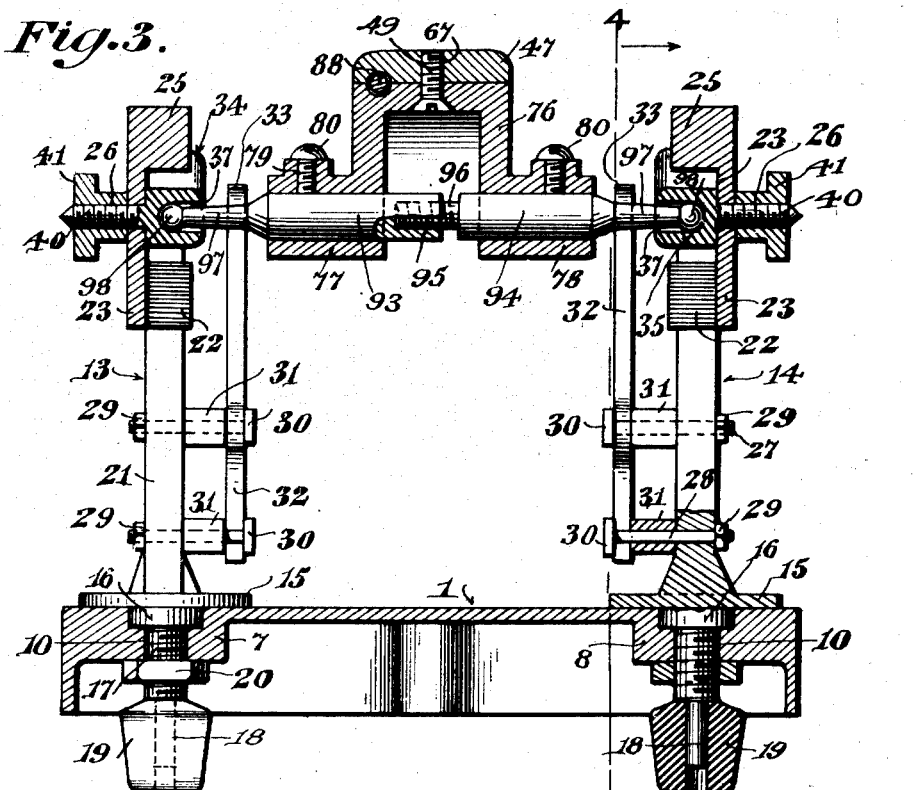
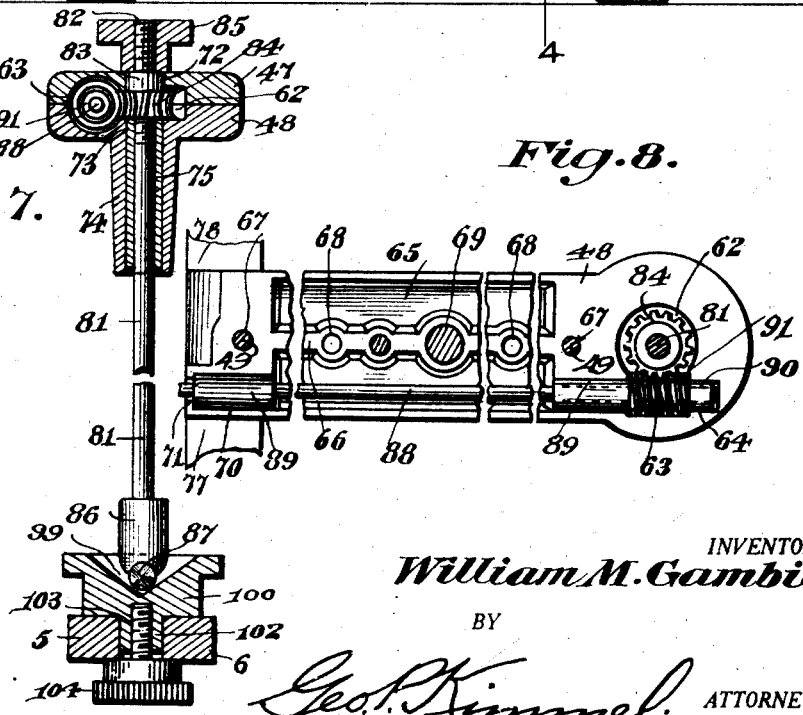
INVENTOR.
William M. Gambill,
BY
Geo. P. Kimmel  ATTORNEY.

Patented Apr. 30, 1929.

1,711,019

UNITED STATES PATENT OFFICE.

WILLIAM M. GAMBILL, OF BOWLING GREEN, OHIO.

ARTICULATOR.

Application filed October 14, 1927. Serial No. 226,173.

This invention relates to a dental articulator, and has for its object to provide, in a manner as hereinafter set forth, an articulator of the class referred to, with adjustable means for efficiently grinding in the teeth to obtain a satisfactory occlusion for producing and perfecting the individual three point contact, the rotation point, the inward slant, the downward slant, and the incisal slant on the occlusal surfaces of the teeth.

A further object of the invention is to provide, in a manner as hereinafter set forth, an articulator having means to provide, combined oscillatory and vertical movements, during the grinding action and further with means for providing a retruded and a protruded bite.

A further object of the invention is to provide, in a manner as hereinafter set forth, a dental articulator for producing retruded and protruded movements and further with means for adjusting the retruded and protruded bites.

A further object of the invention is to provide, in a manner as hereinafter set forth, a dental articulator with a condyle shaft and a new and novel means for adjusting the position of such shaft.

A further object of the invention is to provide, in a manner as hereinafter set forth, a dental articulator with a new and novel form of incisal pin unit of the revolving type and having as a part thereof driven means for bodily revolving the unit and for vertically adjusting the unit.

Further objects of the invention are to provide, in a manner as hereinafter set forth, a dental articulator, which is comparatively simple in its construction and arrangement, strong, durable, adjustable, thoroughly efficient and convenient in its use, readily coupled with a driving means therefor, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a dental articulator, in accordance with this invention.

Figure 2 is a top plan view thereof.

Figure 3 is a cross sectional view thereof.

Figure 4 is a section on line 4—4 Figure 3.

Figure 5 is a section on line 5—5 Figure 4.

Figure 5ᴬ is a view similar to Figure 5 with the adjusting screws backed away from the shaft.

Figure 6 is a fragmentary view of the articulator illustrating the base thereof partly in section.

Figure 7 is a section on line 7—7 Figure 1.

Figure 8 is a section on line 8—8 Figure 1.

Figure 9 is an inverted plan of the upper section of the oscillatory bow.

Figure 10 is a fragmentary view in sectional elevation illustrating a modified form of shaft for the incisal pin unit.

Referring to the drawings in detail 1 generally indicates the base or stationary lower bow and 2 generally indicates the pivoted or oscillatory upper bow. The base 1 has its forward portion 3 of materially less height than the remaining portion 4 thereof. The upper face of the forward portion 3 is arranged below the upper face of the remaining portion 4 of the base. The forward portion 3 of the base is bifurcated to provide a pair of arms 5, 6 arranged in spaced relation and disposed longitudinally. The arms 5, 6 are arranged below the top of the portion 4 of the base. The portion 4 of the base is provided with thickened parts 7, 8 at the rear thereof and a thickened part 9 at the front thereof. The portion 4 of the base is substantially triangular in plan and the portion 3 rectangular. The thickened parts 7, 8 are positioned at each rear corner of the portion 4 of the base and the latter at each rear corner is provided with a countersunk opening 10 and the said openings 10 extend through the parts 7, 8. The thickened part 9 is provided with a depending pin 11 to which is attached a resilient cap or foot piece 12.

Mounted upon the portion 4 of the base 1, at each rear corner of the latter, is a standard and the said standards are generally indicated at 13, 14. As each of said standards is of the same construction, but one will be described as the description of one will apply to the other. The standards are fixedly secured to the rear of the base 1 and when connected therewith are oppositely disposed relative to each other. Each of said standards includes a circular base 15 having formed integral with the lower face thereof a depending arm formed of a circular upper portion 16, a peripherally threaded cylindrical portion 17 of less diameter than the portion 16 and a lower cylindrical portion 18 of less diameter than the intermediate portion 17. The portion 16 is integral with the lower face of the base 15. A resilient cap or foot piece is mounted on the lower portion 18 and said foot piece is indicated at 19. The depending arm extends through the opening 10 and has its upper portion 16 thereof seated in that part of larger diameter of the opening 10. The intermediate portion 17 of the arm projects a substantial distance below a thickened part 7 or 8 and carries a clamping nut 21 which is adapted to abut against a thickened part 7 or 8 and in connection with the upper portion 16 of the arm fixedly secures or clamps the standard to the base. Each standard further includes a tapered upright 21 terminating at its upper end in a quadrant shaped member 22 of greater thickness than the thickness of the upright and formed integral with the outer face of the member 22 is a circular head 23 provided in proximity to its edge with an arcuate slot 24 having its inner face provided with a quadrant shaped member 25 opposing the member 22. The members 22, 25 are disposed diagonally with respect to the inner face of the head 23. The head 23, axially thereof, is formed with an opening 26. Extending through the upright 21 and arranged one above the other and in suitable spaced relation is a pair of headed bolts 27, 28 having their heads spaced from the inner face of the upright. The bolts 27, 28 carry securing nuts 29 which abut against the outer face of the upright. Mounted on the bolts 27, 28 and interposed between the upright 21 and the heads 30 of the bolts are spacing collars 31 of materially less length than the length of the bolts and which are maintained in spaced relation with respect to the heads 30 by a holding spring 32 of the strap type and which is bent to extend around the rear of the bolt 28 and forwardly of the bolt 27 and further is of a length to extend above the opening 26 and is formed with a hoop-shaped upper terminal portion 33. The purpose of the spring 32 will be hereinafter referred to.

Arranged against the inner face of each head 23 is an adjustable holder for the outer end of a condyle shaft section and the said holders are generally indicated at 34, 35. Each holder extends diametrically of a head 23 and is positioned between the members 22, 25.

As the holders 34, 35 are of the same construction, but one will be described as the description of one will apply to the other. Each of said holders comprises an oblong body portion 36 formed with a lengthwise extending groove 37 and a pair of openings 38, 39 which are positioned axially of and at the ends of the body portion and communicate with the groove 37. The wall of each of said openings is threaded. Formed integral with the outer side of the body portion 36, centrally thereof, is a peripherally threaded stem 40 which projects through the opening 26 and carries a clamping nut 41 adapted to abut against the outer face of the head 23 for the purpose of clamping the holder in set position. The groove 37 opens at the inner side of the body portion 36. Formed integral with the outer side of the body portion 36, and operating in the slot 24 is a pointer 42 which associates with a set of graduations 43 formed on the outer face of the head 23, adjacent the slot 24. The pointer, in connection with the scale or graduations 43 enables one to ascertain the setting or rather adjusting of the holder to the desired angular position thereof with respect to the head 23. The nut 41 when loosened permits of shifting the holder to the position desired, and after which the nut 41 is screwed home and the holder is maintained in its adjusted position.

Threadedly engaging with the walls of the openings 38, 39 are a pair of oppositely extending adjusting members 44 having heads 45 and each of which carries a lock nut 46 adapted to abut against an end of the body portion 36 for locking the adjusting member in adjusted position. The adjusting members 44 when set do not lock the condyle shaft from performing an oscillatory function, as after the shaft is adjusted the adjusting members 44 are backed away therefrom. See Figure 5A, under such conditions the oscillation of the upper bow is not prevented. The adjusting members 44 extend in the same plane and are oppositely disposed. The inner ends of the adjusting members are arranged in spaced relation. The adjusting members are provided for angularly adjusting a condyle shaft, to be presently referred to, and said shaft is formed of a pair of sections. A pair of adjusting members is associated with each shaft section.

The oscillatory bow 2 is formed of an upper and a lower section 47, 48, respectively detachably secured together by holdfast devices 49. The forward ends of the sections 47, 48 are substantially circular in contour and are indicated at 50. With reference to Figure 9 which illustrates the inner or lower face of the section 41, it is formed with a circular recess 51, a semi-circular recess 52 which communicates with the recess 51, and a longitudinally extending semi-circular groove 53 which is intersected by the recess 52. The groove 53 is of less width than the recess 52.

The recesses 51 and 52 and groove 53 are formed in the end portion 50. The inner face of the section 47 is further formed intermediate its ends with a concavity 54 and a rib 55 extending lengthwise of and disposed centrally of the concavity 54. The section 47 has a pair of sockets 56 which are formed in the rib 55 and have the walls thereof threaded. The rear end of the section 47, at one side, is provided with an extension 57, and the inner face of said rear end is provided with a semi-circular recess 58 and a semi-circular groove 59 of less length and of less width than the length and width of the recess 58. The groove 59 is formed in the extension 57 and communicates with the recess 58 and the latter has a portion thereof in the extension 57. The rear end of the section 47 is provided with a socket 60 having a threaded wall. The holdfast devices 49 threadedly engage with the walls of the sockets 56 and 60. The section 47 is furthermore provided with an opening 61 of greater diameter than the socket 56 and said opening 61 is arranged in proximity to the rear socket 56.

With reference to Figure 8, which shows the upper or inner face of the section 48 of the oscillatory bow, the end portion 51 is provided with a circular recess 62 which communicates with a semi-circular recess 63 and said end portion 51 is furthermore provided with a lengthwise extending semi-circular groove 64 which is intersected by the recess 63. The groove 64 is of less width than the width of the recess 63. The section 48 has its inner face formed with a concavity 65 and the latter is positioned between the ends of said section. Extending lengthwise of the concavity 65, as well as centrally thereof, is a rib 66. The section 48 is provided with openings 67 arranged in spaced relation and which extend through the rib 66. The section 48 is furthermore provided with spaced openings 68 which extend through the rib 66 and is also formed with an opening 69 of greater diameter than the opening 68 and said opening 69 extends through the rib 66. The section 48 has its inner face, at the rear thereof, formed with a semi-circular recess 70 and a semi-circular groove 71 at one end of the recess 70 and of less width than the width of said recess. The grooves 53 and 59 formed in the section 47 are arranged in alignment and the recesses 52, 58 of the section 47 are also arranged in alignment. The recesses 63 and 70 formed in the section 48 are arranged in alignment and the grooves 64 and 71 of said section are arranged in alignment.

With reference to Figure 7 the section 47, at the end portion 50 thereof is provided with a vertical opening 72 which communicates with the recess 51. The section 48 at the end portion is formed with a vertical opening 73 which communicates with the recess 62. The section 48 is furthermore provided with a depending sleeve 74 having its inner face flush with the wall of the opening 73. The opening 72 is of less diameter than the recess 51 and the opening 73 is of less diameter than the recess 62. When the sections 47 and 48 are secured together, the recesses 51, 62 register, the recesses 52, 63 register, the grooves 53, 64 register, the sockets 56, 60 register with the openings 67, the recesses 58, 70 register, the grooves 59, 71 register and the openings 61, 69 register. The holdfast devices 49 extend through the opening 67 and threadedly engage with the walls of the sockets 56 and 60. Arranged within the sleeve 74 is a tubular bearing 75 which extends into the opening 73. The section 48 at its rear has a hollow depending portion 76 provided with a pair of oppositely disposed tubular arms 77, 78 and each of which at its top is provided with a vertically disposed opening 79 carrying a set screw 80 for a purpose to be presently referred to.

Extending through the bearing 75, recesses 51, 62, opening 72 and extending a substantial distance above the section 47 is a vertically disposed rotatable shaft 81 which forms a part of the incisal pin unit. The upper part of the shaft 81 is peripherally threaded as at 82. Carried by the shaft 81 and mounted in the opening 72 is a collar 83 and secured to the shaft 81 and operating in the registering recesses 51, 62 is a worm pinion 84 of greater diameter than the collar 83. Engaging with the upper end of the shaft 81 is a clamping nut 85 which coacts with the section 47 and collar 83, as well as the worm pinion 84, to prevent the bodily shifting in an upward direction of the shaft 81. Secured to the lower end of the shaft 81 is a coupling member 86 and which is bodily carried by said shaft. Formed integral with the lower end of the coupling member 86, and disposed at right angles with respect thereto, as well as being positioned to one side of the axis of the shaft 81, is a cam member 87 coacting with an incisal unit guide, to be presently referred to, for the purpose of imparting oscillatory and vertical movements to the upper bow 2 on the operation of the shaft 81.

The driving means for the shaft 81 comprises an operating shaft 88 carrying a tubular bearing 89 which is seated in the registering recesses 58 and 70. The shaft 88 further carries a tubular member 90 provided with a worm 91 which meshes with the pinion 84. The tubular member 90 is seated in the registering grooves 53, 64 and the worm 91 is positioned in the registering recesses 52, 63. The rear end of the shaft 88 has connected therewith a flexible shafting 92 which is operated from a prime mover.

The rear end of the oscillatory bow 2 is supported by an angularly adjustable condyle shaft formed of two sections 93, 94 and with the former having its inner end provided with a socket 95 formed with a threaded wall and with the latter having its inner end provided with a reduced peripherally threaded extension 96 which adjustably engages the wall of the socket 95 thereby permitting of the lengthwise adjusting of the shaft. The sections 93, 94 are mounted in the arms 77, 78 and project from the outer ends of said arms. The sections 93, 94 are secured stationary to the arms 77, 78 by the set screws 80. That part of each of the shaft sections which is mounted in an arm 77 or 78 is of greater diameter than the portions of said sections which project from said arms and the outer portions of said shaft sections are indicated at 97 and each has the outer free terminus thereof of globular form as indicated at 98. The hook-shaped upper ends 33 of the springs 32 overlap the reduced outer portions of the shaft sections 93, 94 and the angular adjustment of the condyle shaft is had against the action of the springs 32. The shaft sections 93, 94 extend into the grooves 37 of the holders 34, 35 and the globular outer end 98 of the section 93 is positioned between the opposed ends of the adjusting members of the holder 34 and the globular outer end of the shaft section 94 is positioned and oscillates between the opposed inner ends of the adjusting members of the holder 35. The angular adjustment of the condyle shaft provides for the angular adjustment of the oscillatory upper bow in a horizontal direction. The condyle shaft can also be adjusted vertically or upwardly or downwardly depending upon the position of the holders 34, 35 with respect to the inner faces of the heads 23 of the standards wherefore the upper bow can be adjusted angularly in a horizontal direction and upwardly and downwardly when desired at an inclination.

The guide unit for the incisal point unit consists of a V-shaped trough 99, which is closed at one end as at 100 and the said closed end 100 is formed with an opening 101, having a threaded wall. The trough 99 is mounted upon the arms 5 and 6 of the part 3 of the base 1. The trough 99 has a depending arm 102, formed with a socket 103 provided with a threaded wall and engaging with said wall is a headed securing member 104 adapted to abut against the lower faces of the arms 5, 6 for the purpose of maintaining the trough 99 in adjusted position, as said trough 99 can be shifted lengthwise with respect to the portion 3 of the base 1. Threadedly engaging with the wall of the opening 101 is an adjusting member 104, which coacts with the free end of the cam 87 for adjustably producing the protruded movements of bites.

Secured to the lower face of the upper bow 2 and to the upper face of the base 1 are mono plates 105, 106 respectively. The plate 105 is secured against the lower face of the bow 2, by a clamping member 106', which extends through the registering openings 61 and 69 and has threaded engagement with the plate 105. Setting lugs 107 are carried by the plate 105 and seat in the openings 68. The plate 106 is secured to the portion 4 of the base 1 by an upstanding clamping member 108 which at its upper end has threaded engagement with said plate 106. Setting lugs 109 are carried by the plate 106 and which seat in openings 110 formed at the top of the portion 4 of the base 1.

When the condyle shaft section 93 is angularly adjusted horizontally in a forward direction the shaft section 94 is shifted rearwardly, due to the fact that the shaft sections are coupled together, and when the shaft section 94 is adjusted forwardly the shaft section 93 is shifted rearwardly. The shaft sections can also be adjusted upwardly due to the positioning of the globular ends thereof between the adjusting members, as these latter can be positioned upwardly or downwardly and after so positioned the adjusting members can be shifted to move the shaft sections upwardly or downwardly. The adjustment of the shaft sections horizontally, upwardly or downwardly is had through the medium of the adjusting members carried by the holders.

The condyle shaft sections form bodily shiftable pivots for the upper bow 2, and the springs bearing on the shaft sections act to assist in the oscillatory movements to the bow 2 as such springs will naturally tend to lower the forward end of such bow.

Referring to Figure 10 the rotary shaft of the incisal pin unit is indicated at 111 and is formed with a bevelled lower terminal portion 112, and the latter in cross section is segmental in contour and gradually increasing in cross sectional area from its lower to its upper end. That part of the shaft 111 from the upper end of the portion 112, is of cylindrical cross section throughout. The upper part of the shaft 111 is constructed similar to the upper part of the shaft 81. The part 112 of the shaft 111 operates in the trough 99 and the adjusting member 104' associates therewith. The adjusting member 104' carries a lock nut 105'.

An articulator, constructed in accordance with this invention, provides an efficient means for grinding in the teeth to obtain a thorough satisfactory occlusion for producing and perfecting the individual three point contact, the rotation point, the inward slant, the downward slant and the incisal slant on the occlusal surfaces of the teeth, therefore it is thought the many advantages of an articulator, in accordance with this invention, can be readily understood, and although the preferred embodiment of the invention is as illustrated and described, yet it is to be understood that changes in the details of construction can be had which fall within the scope of the invention as claimed.

What I claim is:—

1. In a dental articulator a condyle shaft adapted to be connected to and provide a pivot for the oscillatory upper bow of the articulator, a pair of spaced standards each formed with a stationary head, a pair of holders adjustable on a horizontal axis, each positioned against the inner face of and supported from a head and carrying means for fixedly securing it in adjusted position, said shaft having its ends extending into said holders, and a pair of oppositely extending adjusting members carried by each holder and having their inner ends abutting an end of the shaft for angularly adjusting the latter when said members are adjusted.

2. In a dental articulator a condyle shaft adapted to be connected to and provide a pivot for the oscillatory upper bow of the articulator, a pair of spaced standards each formed with a stationary head, a pair of holders adjustable on a horizontal axis, each positioned against the inner face of and supported from a head and carrying means for fixedly securing it in adjusted position, said shaft having its ends extending into said holders, and a pair of oppositely extending adjusting members carried by each holder and having their inner ends abutting an end of the shaft for angularly adjusting the latter when said members are adjusted, said members having threaded engagement with said holders and each member provided with a lock nut for locking it in set position.

3. In a dental articulator of that type including an oscillatory upper bow, an angularly and lengthwise adjustable condyle shaft adapted to be connected to and provide a pivot for said upper bow, a pair of standards each provided with a head piece, a pair of holders adjustable on a horizontal axis, each holder positioned against the inner face of and supported from a head and carrying means for fixedly securing it in adjusted position, said holders extending diametrically of the inner face of said head, said shafts having globular ends extending into said holders, and a pair of oppositely disposed adjusting members carried by each holder and having their inner ends abutting a globular end of said shafts for angularly adjusting the latter when the members are adjusted.

4. In a dental articulator of that type including an oscillatory upper bow, an angularly and lengthwise adjustable condyle shaft adapted to be connected to and provide a pivot for said upper bow, a pair of standards each provided with a head piece, a pair of holders adjustable on a horizontal axis, each holder positioned against the inner face of and supported from a head and carrying means for fixedly securing it in adjusted position, said holders extending diametrically of the inner face of said head, said shafts having globular ends extending into said holders, and a pair of oppositely disposed adjusting members carried by each holder and having their inner ends abutting a globular end of said shafts for angularly adjusting the latter when the members are adjusted, said holders being grooved for the reception of the ends of said shafts, and each of said adjusting members provided with a lock nut for locking it in set position.

5. In a dental articulator a condyle shaft adapted to be connected to and provide a pivot for the oscillatory upper bow of the articulator, a pair of spaced standards each formed with a stationary head, a pair of holders adjustable on a horizontal axis, each positioned against the inner face of and supported from a head and carrying means for fixedly securing it in adjusted position, said shaft having its ends extending into said holders, a pair of oppositely extending adjusting members carried by each holder and having their inner ends abutting an end of the shaft for angularly adjusting the latter when said members are adjusted, and said holders and heads having coacting means to indicate the adjustment of the holders.

6. In a dental articulator a condyle shaft adapted to be connected to and provide a pivot for the oscillatory upper bow of the articulator, a pair of spaced standards each formed with a stationary head, a pair of holders adjustable on a horizontal axis, each positioned against the inner face of and supported from a head and carrying means for fixedly securing it in adjusted position, said shaft having its ends extending into said holders, a pair of oppositely extending adjusting members carried by each holder and having their inner ends abutting an end of the shaft for angularly adjusting the latter when said members are adjusted, said members having threaded engagement with said holders and each member provided with a lock nut for locking it in set position, and said holders and heads having coacting means to indicate the adjustment of the holder.

7. In a dental articulator of that type including an oscillatory upper bow, an angularly and lengthwise adjustable condyle shaft adapted to be connected to and provide a pivot for said upper bow, a pair of standards each provided with a head piece, a pair of holders adjustable on a horizontal axis, each holder positioned against the inner face of and supported from a head and carrying means for fixedly securing it in adjusted position, said holders extending diametrically of the inner face of said head, said shafts having globular ends extending into said holders, and a pair of oppositely disposed adjusting members carried by each holder and having their inner ends abutting a globular end of said shafts for angularly adjusting the latter when the members are adjusted, said holders and heads having coacting means to indicate the adjustment of the holders.

8. In a dental articulator of that type including an oscillatory upper bow, an angularly and lengthwise adjustable condyle shaft adapted to be connected to and provide a pivot for said upper bow, a pair of standards each provided with a head piece, a pair of holders adjustable on a horizontal axis, each holder positioned against the inner face of and supported from a head and carrying means for fixedly securing it in adjusted position, said holders extending diametrically of the inner face of said head, said shafts having globular ends extending into said holders, and a pair of oppositely disposed adjusting members carried by each holder and having their inner ends abutting a globular end of said shafts for angularly adjusting the latter when the members are adjusted, said holders being grooved for the reception of the ends of said shafts, each of said adjusting members provided with a lock nut for locking it in set position, and said holders and heads having coacting means to indicate the adjustment of the holders.

9. In a dental articulator a condyle shaft adapted to be connected to and provide a pivot for the oscillatory upper bow of the articulator, a pair of spaced standards each formed with a stationary head, a pair of holders adjustable on a horizontal axis, each positioned against the inner face of and supported from a head and carrying means for fixedly securing it in adjusted position, said shaft having its ends extending into said holders, and a pair of oppositely extending adjusting members carried by each holder and having their inner ends abutting an end of the shaft for angularly adjusting the latter when said members are adjusted, each of said heads provided with an arcuate slot and a graduated scale on its outer face adjacent the slot, and each of said holders provided with a pointer extending through a slot and associated with a scale to indicate the adjustment of the holder.

10. In a dental articulator a condyle shaft adapted to be connected to and provide a pivot for the oscillatory upper bow of the articulator, a pair of spaced standards each formed with a stationary head, a pair of holders adjustable on a horizontal axis, each positioned against the inner face of and supported from a head and carrying means for fixedly securing it in adjusted position, said shaft having its ends extending into said holders, and a pair of oppositely extending adjusting members carried by each holder and having their inner ends abutting an end of the shaft for angularly adjusting the latter when said members are adjusted, said members having threaded engagement with said holders and each member provided with a lock nut for locking it in set position, each of said heads provided with an arcuate slot and a graduated scale on its outer face adjacent the slot, and each of said holders provided with a pointer extending through a slot and associated with a scale to indicate the adjustment of the holder.

11. In a dental articulator of that type including an oscillatory upper bow, an angularly and lengthwise adjustable condyle shaft adapted to be connected to and provide a pivot for said upper bow, a pair of standards each provided with a head piece, a pair of holders adjustable on a horizontal axis, each holder positioned against the inner face of and supported from a head and carrying means for fixedly securing it in adjusted position, said holders extending diametrically of the inner face of said head, said shafts having globular ends extending into said holders, and a pair of oppositely disposed adjusting members carried by each holder and having their inner ends abutting a globular end of said shaft for angularly adjusting the latter when the members are adjusted, each of said heads provided with an arcuate slot and a graduated scale on its outer face adjacent the slot, and each of said holders provided with a pointer extending through a slot and associated with a scale to indicate the adjustment of the holder.

12. In a dental articulator of that type including an oscillatory upper bow, an angularly and lengthwise adjustable condyle shaft adapted to be connected to and provide a pivot for said upper bow, a pair of standards each provided with a head piece, a pair of holders adjustable on a horizontal axis, each holder positioned against the inner face of and supported from a head and carrying means for fixedly securing it in adjusted position, said holders extending diametrically of the inner face of said head, said shafts having globular ends extending into said holders, and a pair of oppositely disposed adjusting members carried by each holder and having their inner ends abutting a globular end of said shaft for angularly adjusting the latter when the members are adjusted, said holders being grooved for the reception of the ends of said shafts, each of said adjusting members provided with a lock nut for locking it in set position, each of said heads provided with an arcuate slot and a graduated scale on its outer face adjacent the slot, and each of said holders provided with a pointer extending through a slot and associated with a scale to indicate the adjustment of the holder.

13. In a dental articulator an upper bow provided at its rear with a pair of oppositely extending tubular arms, condyle shaft sections extending through said arms and fixed thereto, said shaft sections projecting from said arms and adjustably connected at their inner ends, said shaft sections having their outer ends of globular form, angularly adjustable holders for supporting the outer ends of said sections, a pair of oppositely extending adjusting members threadedly engaging with said holders and associated with the globular ends of the sections for angularly adjusting the latter and for maintaining the sections in adjusted position, stationary supporting means for said holders, and means abutting against the outer face of said supporting means for retaining said holders in adjusted position.

In testimony whereof, I affix my signature hereto.

WILLIAM M. GAMBILL.